United States Patent
Rudman et al.

(10) Patent No.: US 9,422,654 B2
(45) Date of Patent: *Aug. 23, 2016

(54) POLYETHERKETONEKETONE NONWOVEN MATS

(75) Inventors: Gilbert W. Rudman, Ambler, PA (US); Gregory S. O'Brien, Downington, PA (US); Christopher A. Bertelo, Doylestown, PA (US)

(73) Assignee: Arkema Inc., King of Prussia, PA (US)

( * ) Notice: Subject to any disclaimer, the term of this patent is extended or adjusted under 35 U.S.C. 154(b) by 910 days.

This patent is subject to a terminal disclaimer.

(21) Appl. No.: 13/257,327

(22) PCT Filed: Mar. 18, 2010

(86) PCT No.: PCT/US2010/027764
§ 371 (c)(1),
(2), (4) Date: Sep. 19, 2011

(87) PCT Pub. No.: WO2010/107976
PCT Pub. Date: Sep. 23, 2010

(65) Prior Publication Data
US 2012/0015577 A1    Jan. 19, 2012

Related U.S. Application Data

(60) Provisional application No. 61/161,979, filed on Mar. 20, 2009, provisional application No. 61/174,666, filed on May 1, 2009.

(51) Int. Cl.
*D04H 3/009*    (2012.01)
*C08L 71/00*    (2006.01)
*D04H 3/14*     (2012.01)

(52) U.S. Cl.
CPC ............... *D04H 3/009* (2013.01); *C08L 71/00* (2013.01); *D04H 3/14* (2013.01); *C08G 2650/40* (2013.01); *Y10T 442/60* (2015.04); *Y10T 442/671* (2015.04)

(58) Field of Classification Search
CPC ... C08G 2650/40; C08L 71/00; D04H 3/009; D04H 3/14; Y10T 442/60; Y10T 442/671
USPC ........ 428/34.1, 34.5, 34.6, 36.9, 36.91, 398, 428/564; 442/327, 334, 361, 381, 392
See application file for complete search history.

(56) References Cited

U.S. PATENT DOCUMENTS

| | | |
|---|---|---|
| 3,065,205 A | 11/1962 | Bonner et al. |
| 3,441,538 A | 4/1969 | Marks et al. |

(Continued)

FOREIGN PATENT DOCUMENTS

| | | |
|---|---|---|
| CA | 2049585 | 3/1992 |
| CN | 1974631 A | 11/2006 |

(Continued)

OTHER PUBLICATIONS

International Search Report for International Application No. PCT/US/10/021102 dated Mar. 31, 2010.

(Continued)

*Primary Examiner* — Arti Singh-Pandey
(74) *Attorney, Agent, or Firm* — Lynn B. Morreale

(57) ABSTRACT

The invention provides nonwoven mats comprising polyetherketoneketone fibers or mixtures thereof. Also provided are filters, textiles, blankets, and insulation prepared from polyetherketoneketone nonwoven mats, as well as methods for manufacturing the same.

17 Claims, 2 Drawing Sheets

(56) References Cited

U.S. PATENT DOCUMENTS

| | | | |
|---|---|---|---|
| 3,442,857 A | 5/1969 | Thornton | |
| 3,516,966 A | 6/1970 | Berr | |
| 3,519,206 A | 7/1970 | Leaders | |
| 3,666,612 A | 5/1972 | Angelo | |
| 3,929,164 A | 12/1975 | Richter | |
| 4,359,501 A | 11/1982 | DiTullio | |
| 4,704,448 A | 11/1987 | Brugel | |
| 4,747,988 A | 5/1988 | Deeg | |
| 4,816,556 A | 3/1989 | Gay et al. | |
| 4,820,571 A | 4/1989 | Searfass | |
| 4,891,084 A | 1/1990 | Senior | |
| 4,954,605 A | 9/1990 | Deeg | |
| 4,992,485 A | 2/1991 | Koo et al. | |
| 4,996,287 A | 2/1991 | Bloom | |
| 5,034,157 A | 7/1991 | Merrell et al. | |
| 5,049,340 A | 9/1991 | Moss et al. | |
| 5,124,413 A | 6/1992 | Luise | |
| 5,130,408 A | 7/1992 | Deeg | |
| 5,238,725 A | 8/1993 | Effing et al. | |
| 5,260,104 A | 11/1993 | Bryant et al. | |
| 5,290,906 A | 3/1994 | Matsumura et al. | |
| 5,300,122 A * | 4/1994 | Rodini | 8/607 |
| 5,409,757 A | 4/1995 | Muzzy et al. | |
| 5,429,864 A | 7/1995 | Samuels | |
| 5,470,639 A | 11/1995 | Gessner et al. | |
| 5,601,893 A | 2/1997 | Strassel et al. | |
| 5,667,146 A | 9/1997 | Pimentel et al. | |
| 5,730,188 A | 3/1998 | Kalman et al. | |
| 5,997,989 A | 12/1999 | Gessner et al. | |
| 6,004,160 A | 12/1999 | Korsunsky et al. | |
| 6,132,872 A | 10/2000 | McIntosh et al. | |
| 6,177,518 B1 | 1/2001 | Lahijani | |
| 6,383,623 B1 | 5/2002 | Erb, Jr. | |
| 6,668,866 B2 | 12/2003 | Glejbol et al. | |
| 6,773,773 B2 | 8/2004 | Hauber | |
| 6,857,452 B2 | 2/2005 | Quigley et al. | |
| 6,978,806 B2 | 12/2005 | Glejbol et al. | |
| 7,055,551 B2 | 6/2006 | Fraser et al. | |
| 7,302,973 B2 | 12/2007 | Glejbol et al. | |
| 2003/0032339 A1 | 2/2003 | Bell et al. | |
| 2003/0047317 A1 | 3/2003 | Powers | |
| 2005/0181203 A1 | 8/2005 | Rawlings et al. | |
| 2007/0004307 A1 | 1/2007 | Wyss et al. | |
| 2007/0036925 A1 | 2/2007 | Braad | |
| 2007/0066741 A1 | 3/2007 | Donovan et al. | |
| 2007/0106006 A1 | 5/2007 | Cooper et al. | |
| 2007/0142569 A1 | 6/2007 | Donovan et al. | |
| 2007/0148457 A1 | 6/2007 | Wagner et al. | |
| 2007/0212963 A1 | 9/2007 | Keep | |
| 2007/0243762 A1 | 10/2007 | Burke et al. | |
| 2008/0009903 A1 | 1/2008 | Schmieding et al. | |
| 2008/0063847 A1 | 3/2008 | Chang et al. | |
| 2008/0139065 A1 * | 6/2008 | Amarasekera et al. | 442/189 |
| 2008/0190507 A1 | 8/2008 | Hardy | |
| 2008/0248201 A1 | 10/2008 | Corkery et al. | |
| 2008/0255647 A1 | 10/2008 | Jensen et al. | |
| 2008/0312387 A1 | 12/2008 | El-Hibri et al. | |
| 2011/0287255 A1 * | 11/2011 | Bertelo et al. | 428/401 |
| 2011/0294943 A1 * | 12/2011 | Bertelo et al. | 524/540 |
| 2011/0311811 A1 * | 12/2011 | Collette et al. | 428/373 |

FOREIGN PATENT DOCUMENTS

| | | |
|---|---|---|
| EP | 0 473 430 A2 | 3/1992 |
| WO | WO 92/05223 | 4/1992 |
| WO | WO 2006/052732 A2 | 5/2006 |
| WO | WO 2008/113362 | 9/2008 |
| WO | WO 2008/119677 | 10/2008 |
| WO | WO 2010/085419 | 7/2010 |
| WO | WO 2010/088638 | 8/2010 |
| WO | WO 2010/088638 A1 | 8/2010 |
| WO | WO 2010/088639 | 8/2010 |
| WO | WO 2010/091135 | 8/2010 |
| WO | WO 2010/091136 | 8/2010 |
| WO | WO 2010/111335 | 9/2010 |

OTHER PUBLICATIONS

International Search Report for International Application No. PCT/US/10/022796 dated Mar. 5, 2010.
International Search Report for International Application No. PCT/US/10/022797 dated Feb. 25, 2010.
International Search Report for International Application No. PCT/US/10/023131 dated Mar. 15, 2010.
International Search Report for International Application No. PCT/US/10/023129 dated Mar. 15, 2010.
International Search Report for International Application No. PCT/US/10/027764 dated May 4, 2010.
International Search Report for International Application No. PCT/US/10/028417 dated May 11, 2010.
Book: Jiangsu Silk, No. 3, Dec. 31, 2006, Jin, Xiaodan, Ultra-fine non-woven fabric and applications thereof. pp. 29-34.

* cited by examiner

POLYETHERKETONEKETONE NONWOVEN MATS

CROSS-REFERENCE TO RELATED APPLICATIONS

This application is a national stage application under 35 U.S.C. §371 of PCT/US2010/027764, filed Mar. 18, 2010, which claims benefit to U.S. Provisional Application No. 61/161,979 filed on Mar. 20, 2009, and U.S. Provisional Application No. 61/174,666 filed on May 1, 2009 all of which are hereby incorporated by reference.

FIELD OF THE INVENTION

The invention relates generally to polymer chemistry. More specifically, the invention relates to thermoplastic fiber nonwoven mats useful for solvent, heat, and flame resistance.

BACKGROUND OF THE INVENTION

Various publications, including patents, published applications, technical articles and scholarly articles are cited throughout the specification. Each of these citations is incorporated by reference herein, in its entirety.

Nonwoven materials are used in a variety of applications, including fabrics, textiles, absorbent pads, bags, and the like. Nonwovens can be prepared from natural or synthetic fibers such as thermoplastic polymers.

Most durable and disposable nonwovens are made of polypropylene, although other commodity plastics such as polyethylene, polyethylene terephthalate and nylon-6 also are used to make nonwovens. But, these traditional polymers do not work well at elevated temperatures and in aggressive environments. In many end use applications such as filters for chemical processes and pollution control, a nonwoven material may be exposed over a long period of time to relatively harsh environmental conditions, such as high temperatures, organic solvents, corrosive or reactive chemicals, and/or acidic or basic substances. It would therefore be desirable to develop high performance nonwovens that are capable of withstanding such conditions without significant deterioration in their performance or their structural integrity.

SUMMARY OF THE INVENTION

The invention features nonwoven mats comprising polyetherketoneketone fibers or mixtures thereof. The polyetherketoneketone fibers can be monofilaments or multifilaments.

The polyetherketoneketone or mixture thereof preferably has repeating units represented by Formula I and Formula II:

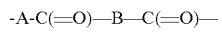

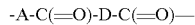

where A is a -Ph-O-Ph- group, Ph is a phenylene radical, B is p-phenylene, and D is m-phenylene.

The polyetherketoneketone or mixture thereof used in the mats preferably has a Formula I:Formula II ratio of from about 50:50 to about 90:10. In some aspects, the ratio is 80:20. The polyetherketoneketone or mixture thereof used in the mats can have a crystallinity, as measured by DSC, of from about 10% to about 40%. In some aspects, the polyetherketoneketone or mixture thereof is semi-crystalline.

The polyetherketoneketone mats can be used in a variety of applications. Accordingly, the invention also features filters, clothing/textiles, blankets, and insulation comprising at least one nonwoven mat comprising polyetherketoneketone fibers or mixtures thereof such as those described and exemplified herein.

The invention also features nonwoven mats comprising at least one core layer comprising polyetherketoneketone fibers or mixtures thereof and at least one shell layer comprising polyetherketoneketone fibers or mixtures thereof. Preferably, the shell layer polyetherketoneketone fibers or mixtures thereof have a lower T:I ratio relative to the core layer polyetherketoneketone fibers or mixtures thereof. In some preferred embodiments, the core layer polyetherketoneketone fibers or mixtures thereof have a T:I ratio of at least about 60:40. In some preferred embodiments, the core layer polyetherketoneketone fibers or mixtures thereof have a T:I ratio of about 80:20. In some preferred embodiments, the shell layer polyetherketoneketone fibers or mixtures thereof have a T:I ratio less than about 60:40.

The invention also features nonwoven mats comprising at least two sections. In some aspects, at least one section comprises polyetherketoneketone fibers or mixtures thereof that have a lower T:I ratio relative to the T:I ratio of polyetherketoneketone fibers or mixtures thereof comprised in another section. In some preferred embodiments, at least one section comprises polyetherketoneketone fibers or mixtures thereof having a T:I ratio of at least about 60:40, and at least one section comprises polyetherketoneketone fibers or mixtures thereof having a T:I ratio of less than about 60:40.

The invention also features nonwoven mats comprising a first layer comprising polyetherketoneketone fibers or mixtures thereof and a second layer comprising polyetherketoneketone fibers or mixtures thereof. Preferably, the second layer polyetherketoneketone fibers or mixtures thereof have a lower T:I ratio relative to the first layer polyetherketoneketone fibers or mixtures thereof. In some preferred embodiments, the first layer polyetherketoneketone fibers or mixtures thereof have a T:I ratio at least about 60:40. In some preferred embodiments, the first layer polyetherketoneketone fibers or mixtures thereof have a T:I ratio of about 80:20. In some preferred embodiments, the second layer polyetherketoneketone fibers or mixtures thereof have a T:I ratio less than about 60:40.

Also featured are methods to manufacture filters, clothing/textiles, blankets, and insulation comprising at least one nonwoven mat comprising polyetherketoneketone fibers or mixtures thereof.

DETAILED DESCRIPTION OF THE INVENTION

Figure 1:
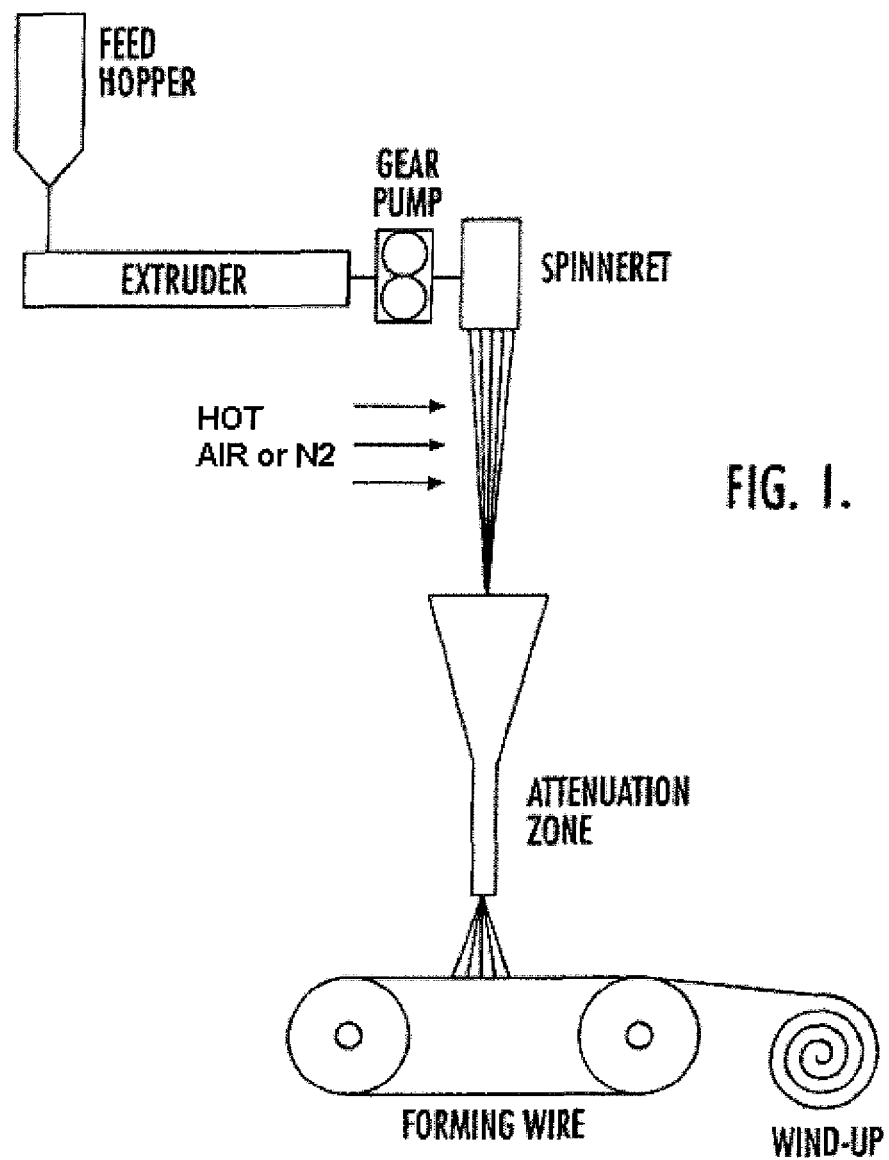
FIG. 1: Represents a typical fiber spinning device, and used to produce nonwoven mats

It is to be understood that this invention is not limited to particular methods, reagents, compounds, or compositions discussed as embodiments of the invention. It is also to be understood that the terminology used herein is for the purpose of describing particular aspects only, and is not intended to be limiting.

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

It has been discovered in accordance with the present invention that polyetherketoneketone fibers have an advantage over other thermoplastic polymers, among other things, in terms of their capacity for crystallinity adjustment through selection of the ratio of different repeating unit isomers, which provides further advantages for adjusting the cooling rate, the softening point, the kinetics of the crystallization, and the degree of crystallinity of the polyetherketoneketone fibers. Additionally, polyetherketoneketone fibers exhibit exceptionally good dimensional stability and low creep at elevated temperatures, are highly resistant to common organic solvents, and have little tendency to absorb water. These advantages provide polyetherketoneketone fibers with the capacity to be assembled into nonwoven mats, which can be used in various applications where protection from heat and/or one or more solvents is desirable. Accordingly, the invention features nonwoven mats comprising polyetherketoneketone fibers or mixtures thereof.

Polyetherketoneketones (PEKK) are known generally in the art, and can be prepared using any suitable polymerization technique, including the methods described in the following patents: U.S. Pat. Nos. 3,065,205; 3,441,538; 3,442,857; 3,516,966; 4,704,448; 4,816,556; and 6,177,518. Mixtures of polyetherketoneketones may be used.

The polyetherketoneketones suitable for use in the present invention can comprise repeating units represented by the following formulas I and II:

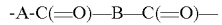

-A-C(=O)—B—C(=O)—                        I

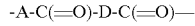

-A-C(=O)-D-C(=O)—                         II where A is a -Ph-O-Ph-group, Ph is a phenylene radical, B is p-phenylene, and D is m-phenylene. The Formula I:Formula II (T:I) isomer ratio in the polyetherketoneketone can range from about 100:0 to about 0:100.

In some aspects, a mixture of polyetherketoneketones is employed containing polyetherketoneketones having different Formula I to Formula II ratios. For example, a polyetherketoneketone having a T:I ratio of 80:20 may be blended with a polyetherketoneketone having a T:I ratio of 60:40, with the relative proportions being selected to provide a polyetherketoneketone mixture having the balance of properties desired for the mats prepared from these fibers.

Thus, polyetherketoneketones with various T:I ratios can be used. Any suitable blend of these T:I ratios can also be used. Non-limiting examples of suitable T:I ratios include about 90:10, about 85:15, about 80:20, about 75:25, about 70:30, about 65:35, about 60:40, about 55:45, about 50:50, about 45:55, about 40:60, about 35:65, about 30:70, about 25:75, about 20:80, about 15:85, and about 10:90, or blends thereof.

The T:I ratio can be adjusted so as to provide an amorphous (non-crystalline) polyetherketoneketone. Fibers made from a polyetherketoneketone that has little or no crystallinity will generally be less stiff and less brittle than fibers made from a more crystalline polyetherketoneketone. However, as crystallinity of the polyetherketoneketone is increased, the fiber strength generally also increases. In particular, fibers containing a partially crystalline polyetherketoneketone are capable of being oriented during drawing of the fibers post-extrusion so as to further strengthen the fibers.

Higher amorphous content (which can be achieved by blending or polymerization) generally yields higher ductility, while higher crystalline content yields higher strength at elevated temperatures. Using a blend of polyetherketoneketones of different crystallinities, rather than a combination of polymers having different chemical compositions, yields a higher integrity fiber which does not exhibit the incompatibility and loss of performance issues that can often occur when different polymers are combined.

In general, a polyetherketoneketone having a relatively high Formula I:Formula II ratio will be more crystalline than a polyetherketoneketone having a lower Formula I:Formula II ratio. The strength, stiffness/flexibility and other mechanical, thermal, thermomechanical and other properties of the fibers and mats of the present invention can be varied as desired by controlling the crystallinity of the polyetherketoneketone or polyetherketoneketone mixture, thereby avoiding the need to blend in other polymers or plasticizers, which can lead to phase separation problems.

In some aspects, the crystallinity of the polyetherketoneketone or mixture of polyetherketoneketones, as measured by differential scanning calorimetry (DSC), and assuming that the theoretical enthalpy of 100% crystalline polyetherketoneketone is 130 J/g, is from about 0 to about 50%. In some preferred aspects, the polyetherketoneketone crystallinity, as measured by DSC, is from about 10 to about 40%. In some aspects, the crystallinity is from about 30 to about 35%.

Table 1 demonstrates the effect of varying the T:I ratio on the various properties of two representative polyetherketoneketones.

TABLE 1

| Property | Test Method | I:II Ratio = 60:40 | I:II Ratio = 80:20 |
|---|---|---|---|
| Crystallinity | DSC | None* | 30-35 |
| Water Absorption @ 24 hr., % | ASTM D570 | <0.2 | <0.3 |
| Tensile Strength (Break), Kpsi | ASTM D638 | 13 | 16 |
| Tensile Modulus, Mpsi | ASTM D638 | 0.5 | 0.64 |
| Elongation (Break), % | ASTM D638 | >80 | 12 |
| Flexural Strength (Yield), Kpsi | ASTM D570 | 20 | 28 |
| Flexural Modulus, Mpsi | ASTM D570 | 0.49 | 0.66 |
| Izod, Notched, ft-lb/in | ASTM D256 | 0.9 | 1.3 |
| Compressive Strength, Kpsi | ASTM D695 | 15 | 30 |
| Coefficient of Friction | ASTM D1894 | 0.186 | 0.173 |
| Coefficient of Friction, Static | ASTM D1894 | 0.285 | 0.262 |
| Melting Point, ° F. | DSC | 585 | 680 |
| Tg, ° F. | DSC | 310 | 325 |
| Melt Index, g/10 min | 8.4 kg at 380° C. | 35-45 | 100-120 |
| Flammability Rating | UL94 | V-0 | V-0 |
| HDT @ 264 psi, ° F. | ASTM D648 | 286 | 347 |

*technically, this polymer is semi-crystalline, but due to its very slow crystallization rate it is regarded as amorphous in terms of conventional processing techniques.

As can be seen from Table 1, if a more ductile fiber is desired (thereby enhancing the ability of the fiber and nonwoven mat prepared therefrom to flex or bend without cracking), or a less heat resistant mat is desired, the ratio of Formula I to Formula II repeating units in the polyetherketoneketone should be decreased. If, on the other hand, it is desired to increase the heat distortion resistance and/or flexural strength of the fiber and a nonwoven mat prepared from such fiber, then the Formula I to Formula II ratio should be selected to be a relatively high value. For example, as shown in Table 1, the flexural strength increases from 20 to 28 kpsi, and the heat distortion temperature (HDT) increases from 286 to 347 degrees F. when the Formula I to Formula II ratio is increased from 60:40 to 80:20. Thus, for enhanced thermal resistance, a higher Formula I to Formula II ratio is preferred.

Suitable polyetherketoneketones are available from commercial sources, such as, for example, the polyetherketoneketone sold under the brand name OXPEKK® by Oxford Performance Materials, Enfield, Conn., including OXPEKK®-C and OXPEKK®-SP polyetherketoneketone.

In addition to PEKK, the fibers can comprise various other suitable additives and components known in the thermoplastic fiber art such as fillers, pigments, processing aids, stabilizers and the like.

In some aspects, the PEKK fibers can be various lengths and/or diameters, or can be a uniform length and/or diameter. The PEKK fibers can be at least about 0.1 mm in length, although any size fiber can be used. PEKK fibers with longer lengths are particularly preferred for preparing nonwoven mats.

The diameter of the PEKK fibers is not limited, and may be adjusted or varied as needed to suit particular end-use applications. For example, the fiber may have a diameter of from about 50 microns to about 2 mm, although fibers of larger or smaller diameter, and fibers at any diameter within this range can be used. Microfibers (i.e., fibers having sub-denier thicknesses) can also be used in nonwoven mats in accordance with the present invention.

The cross-sectional shape of the PEKK fibers can vary, and can, for example, be round, oval, square, rectangular, star-shaped, trilobal, or triangular, or any other shape. The fiber can be solid or hollow. The fiber can be in the form of a continuous filament such as a monofilament or in discrete, elongated pieces, and two or more fibers can be spun into multifilaments such as yarns, strings or ropes.

In preferred aspects, the PEKK fibers are assembled into nonwoven mats. One notable advantage of using PEKK fibers is that PEKK crystallizes at a slower rate relative to other thermoplastic polymers. Thus, the slower crystallizing PEKK allows more time to fuse together a nonwoven mat before crystallization of the fibers. Nonwoven mats can be prepared according to any suitable method known in the art. For example, the mats can be prepared by spunbond technology, which methodologies would be expected to be known by those of skill in the art.

Using spunbond technology, for example, extruded PEKK fibers can be spun and cooled. The fibers can be formed from PEKK extruded from spinnerets and then air-cooled. The spun fibers can then be deposited, for example, onto a belt or screen and bonded together. The fibers may be randomly oriented on the belt, or may be ordered in a desired orientation. Bonding can proceed by heating, for example, by using rollers or needles to partially melt the PEKK fibers, which fuse together as they cool. In some aspects, the spun fibers can be deposited on a form or mold and bonded together to form a pre-shaped mat.

The mats can also be prepared by meltblown technology, which methodologies would be expected to be known by those of skill in the art. In brief, molten PEKK fibers can be extruded through a die of any desirable diameter and/or shape, and then, high high-velocity hot air blows the molten fibers from the die tip onto a belt, screen, form, or mold. The partially melted fibers self-bond together into a mat as they cool on the base. PEKK fibers having a higher concentration of Formula II isomers are advantageous for meltblown preparation of mats because they facilitate and ensure good fusion of the fibers into a mat on the belt, screen form, or mold.

The mats can also be prepared by electrospinning technology. In electrospinning, PEKK fibers are produced by high voltage, which generates a charged stream of molten PEKK, which can then be deposited onto belt, screen, form, or mold, and which will self-bond together into a mat as the fibers cool.

The PEKK mats can be prepared using fibers having any suitable T:I ratio, including those described herein. In addition, the PEKK mats can be prepared in any density of fibers suitable for the application to which the mats will be used. In some aspects, the fibers are bonded at a density between about 0.001 g/cm$^3$ and about 5 g/cm$^3$, depending on the application in which the mat is to be used, although mats having greater or lower fiber densities, or any density within this range can be used.

The mats can comprise more than one layer and/or more than one section comprised of PEKK fibers having different properties. For example, in some aspects, the mats can comprise at least two PEKK layers, including a first layer and a second layer. In some aspects, the mats can have a core-shell configuration, for example, a core layer encapsulated by or otherwise positioned between a shell layer on each side of the core. In some aspects, the mats can have a multiple section or component configuration. Each layer or each section or component may comprise PEKK fibers having a different T:I ratio relative to another layer, section, or component.

In a first layer and second layer configuration, the first layer can comprise PEKK fibers having a higher concentration of Formula I (high T:I ratio) relative to the second layer. The second layer can have a higher concentration of Formula II (low T:I ratio) relative to the first layer. A higher concentration of Formula I can enhance the strength and rigidity of the first layer, and a higher concentration of Formula II in the second layer can facilitate thermal bonding of the mat to other mats, fabrics, materials, structures, and the like.

In a core-shell configuration, one or more core layers can comprise PEKK fibers having a higher concentration of Formula I (high T:I ratio) relative to the shell layers in order to increase the strength of the core. The shell layers can comprise PEKK fibers having a higher concentration of Formula II (low T:I ratio) relative to the core layers in order to facilitate thermal bonding of the mat to other mats, fabrics, materials, structures, and the like. The core and/or shell layers can each comprise more than one layer of PEKK fibers.

In a multiple section or component configuration, a nonwoven mat or layer thereof can comprise at least two sections or components, with each section or component having a different T:I ratio relative to another section or component. In one non-limiting example, a multiple section configuration may include a perimeter section of the mat having a higher concentration of Formula I (or Formula II) relative to an interior section of the mat. In another non-limiting example, the mats can comprise alternating sections or patch-like sections, with each section having a higher concentrations of Formula I or II relative to another section. Thus, one or more sections or components of a non-woven mat can be prepared with PEKK fibers having a higher concentration of Formula II to enhance flexibility of such sections or components of the mat or to facilitate thermal bonding of the mat to other mats, fabrics, materials, or structures. In addition, one or more sections or components of a non-woven mat can be prepared with PEKK fibers having a higher concentration of Formula I to confer strength and rigidity to such sections or components of the mat. The mat can comprise any number and/or geometric or spatial orientation of sections or components. The mats can be used in any application where resistance to elevated temperatures and/or solvents and/or chemicals (acids, bases, reactive compounds) is desirable. In one preferred aspect, the mats are assembled into a fitter for filtration or separation of liquids, preferably heated liquids or solvents. Such filters are also useful in the processing of hot gases. The filter can comprise at least one PEKK nonwoven mat. In some aspects, the filter can comprise at least two, at least three, at least four, at least five, or more PEKK nonwoven mats. In such filters, mats can be removably layered on top of each other, or one or more, or all of the layers can be bonded together.

In multi-layer filters, each layer can be comprised of a PEKK mat having a different thickness and/or density of PEKK fibers, including those described and exemplified herein. Such filters can be used to control the rate at which a liquid or gas passes through the filter and/or can be used to separate or trap different sized particles present in the liquid or gas. The filters can be prepared in any shape or size suitable for the use to which the filter is intended. In addition to at least one mat comprised of nonwoven PEKK fibers, the filter may contain one or more additional layers comprised of different materials, such as glass fibers, metal fibers or carbon fibers.

A filter containing a nonwoven mat comprised of polyetherketoneketone fibers in accordance with the present invention may, if so desired, be constructed using a frame, support or other component of the filter that is also comprised of PEKK. For example, the nonwoven mat may be held within a molded PEKK frame, wherein the frame allows the assembled filter to be readily handled (e.g., placed in the desired position within an apparatus and then later removed, replaced or cleaned).

In another preferred aspect, the PEKK mats are assembled into protective textiles/clothing or a protective blanket. The PEKK mats can be used as an inner or outer layer of the protective clothing or blanket, or can comprise the article of clothing or blanket. PEKK mat-containing clothing or blankets can be used, for example, to protect property, persons or animals against a fire or a chemical spill. Clothing would include, without limitation, shirts, jackets, pants, socks, gloves, masks, hats, shoes, boots, aprons, and the like.

In another preferred aspect, the PEKK mats are assembled into or otherwise used as protective insulation. Thus, such mats are useful as construction, engineering, and manufacturing materials. The insulation can comprise at least one PEKK nonwoven mat. In some aspects, the insulation can comprise at least two, at least three, at least four, at least five, or more PEKK nonwoven mats. The insulation can comprise any suitable size, thickness and/or density of PEKK nonwoven mats.

PEKK mat insulation can be used, for example, in the walls, ceilings, and/or floors of buildings, and can be used in vehicles, including automobiles, train cars, watercraft, aircraft, and the like. In vehicles, the insulation mats could be used in the walls, ceilings, floors, doors, bulkheads, seats, and the like. PEKK mat insulation can also be used, for example, in appliances, furnaces, and laboratory, medical, or industrial equipment.

Mats of non-woven PEKK fibers may also be used in the manufacture of composite materials wherein the mats are embedded within a thermoset or thermoplastic matrix or are used as one or more layers within a laminate.

The present invention is not limited to the embodiments described and exemplified above, but is capable of variation and modification within the scope of the appended claims.

EXAMPLES

Example 1

A lightweight multilayer insulating blanket, of a type appropriate for use in aircraft, may be fabricated as follows—An insulating insert for said blanket is prepared by forming a non-woven blanket by meltblowing a felt composed of OXPEKK-SP. The felt mat is expanded into a foamed, but still non-woven felt mat, with good control using a process like $CO_2$ infusion and expansion (practiced by MicroGreen of WA, US) to increase volume and insulating ability through the use of dead space without adding weight. This felt insert is trimmed to fit inside a film shell (preferably of OXPEKK-C), which is heat sealed to contain the felt insulator. The outer shell may optionally be aluminized or otherwise treated to reject radiant heat to increase efficacy and improve fire resistance. The blanket so made is capable of replacing current blankets, which use glass fiber wool, in aircraft applications where weight is at an extreme premium.

Example 2

Production of a PEKK Non Woven Fibers

A low T/I ratio, amorphous grade, of Polyetherketoneketone, PEKK (such as OXPEKK SP from Oxford Performance materials) was dried overnight at 120° C. and then extruded and formed into fibers using a standard fiber spinning device as depicted in FIG. 1.

Figure 2:
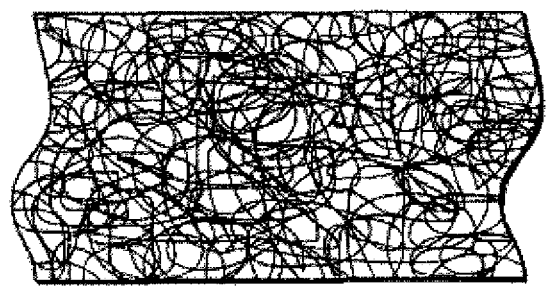
FIG. 2: Represents the orientation of fibers in a nonwoven mat.

The extruder is operated at 20-60 RPM and heated to 315° C. for the feed zone, 320° C. for the middle zone and 330° C. for the final zone, gear pump and spinneret. The spinneret can be designed to form one or preferably multiple fibers. The fibers are directed to the forming wire using an air stream with or without an attenuation zone. For highly crystalline fibers such as PEEK and PEKK, the rate of crystallization is very fast when compared to polymers normally used to produce non-woven materials. Thus rather than cooling the fibers with cool or tepid air, when forming polarylate fibers the cooling rate is actually retarded by the use of a hot air or nitrogen stream. The temperature of the stream is adjusted so as to maintain the polymer in a soft state until it lays out on the forming wire. Hot air can also be used in the attenuation zone (as described in U.S. Pat. Nos. 5,470,639 and 5,997,989) to orient and elongate the polymer. The fibers are laid down on the forming wire so as to produce a mat of random fibers as shown in FIG. 2. Hot air can also be used to resoften the outer surface of the fibers to allow them to bond together where the fibers touch.

By varying the T/I ratio the flexibility, toughness, crystallization and final use temperature of the fibers can be adjusted. When using PEKK with higher T/I ratios it will be necessary to increase the temperatures in the various heating zones by 30 to 50° C., but other wise the conditions and process is very similar.

Example 3

Using a fiber spinning device similar to that depicted in FIG. 1, but equipped with two extruders and two gear pumps that feed into the spinneret, a two layer fiber is produced in a coextrusion system. Temperature and conditions are similar to those above. The flow rates, of the different polymers are adjusted by the size of the extruders and the speed of the screws to form the desired thickness layers. Typically the higher T/I ratio polymer, which will also be stiffer, would be at the center of the fiber, and the lower T/I ratio polymer, which will soften at a lower temperature, will be placed at the periphery of the fiber. In this case the primary extruder, which is processing the high T/I ratio material for the center of the fiber, would be operated at a slightly higher temperature (30-50° C.) than the secondary extruder, which is processing the lower T/I ratio material.

Hot air is still used to maintain the fibers in a soft state as they are laid onto the forming wire in a random pattern and additional hot air can be used to soften the outer layers of the two layer fiber while on the forming wire to bond the fibers into a mat.

What is claimed:

1. A nonwoven mat consisting of first polyetherketoneketone fibers or mixtures thereof, wherein said first polyetherketoneketone has repeating units of isomer T represented by Formula I and a repeating unit of isomer I represented by Formula II:

-A-C(=O)—B—C(=O)—     I

-A-C(=O)-D-C(=O)—     II where A is a -Ph-O-Ph- group, Ph is a phenylene radical, B is p-phenylene, and D is m-phenylene, in a T:I isomer ratio of from 50:50 to 90:10, and wherein said first polyetherketoneketone is semi-crystalline having a crystallinity of from about 10% to about 40% as measured by DSC, wherein said mixtures consist of said first polyetherketoneketone fibers and one or more second polyether ketoneketone fibers having a different T:I isomer ratio and/or different crystallinity from said first polyetherketoneketone fibers, and optionally one or more additives selected from the group consisting of pigments, processing aids, and stabilizers.

2. The nonwoven mat of claim 1, wherein the fibers are monofilaments.

3. The nonwoven mat of claim 1, wherein the fibers are multifilaments.

4. The nonwoven mat of claim 1, wherein the polyetherketoneketone or mixture thereof has a crystallinity, as measured by DSC, of from about 30% to about 35%.

5. An article comprising at least one nonwoven mat according to claim 1, wherein the article is selected from a filter or blanket.

6. A textile comprising at least one nonwoven mat according to claim 1.

7. The nonwoven mat of claim 1 comprising at least one core layer consisting of said first polyetherketoneketone fibers or mixtures thereof and at least one shell layer consisting of said first polyetherketoneketone fibers or mixtures thereof, wherein the polyetherketoneketone or mixture thereof present in the shell layer has a lower T:I isomer ratio than the polyetherketoneketone or mixture thereof present in the core layer.

8. The nonwoven mat of claim 7, wherein the core layer polyetherketoneketone or mixture thereof has a T:I isomer ratio of at least about 60:40.

9. The nonwoven mat of claim 7, wherein the core layer polyetherketoneketone or mixture thereof has a T:I isomer ratio of about 80:20.

10. The nonwoven mat of claim 7, wherein the shell layer polyetherketoneketone or mixture thereof has a T:I ratio less than about 60:40.

11. A nonwoven mat comprising at least two sections consisting of polyetherketoneketone fibers or mixtures thereof and optionally one or more additives selected from the group consisting of pigments, processing aids, and stabilizers, wherein the polyetherketoneketones or mixtures thereof have repeating units represented by Formula I (isomer T) and Formula II (isomer I):

-A-C(=O)—B—C(=O)—     I

-A-C(=O)-D-C(=O)—     II where A is a -Ph-O-Ph- group, Ph is a phenylene radical, B is p-phenylene, and D is m-phenylene, in a T:I isomer ratio of from 50:50 to 90:10, and wherein said polyetherketoneketone is semi-crystalline having a crystallinity of from about 10% to about 40% as measured by DSC; and wherein at least one section of polyetherketoneketone fibers or mixtures thereof has a lower T:I isomer ratio relative to the polyetherketoneketone fibers or mixtures thereof of another section.

12. The nonwoven mat of claim 11, wherein at least one section of polyetherketoneketone fibers or mixtures thereof has a T:I isomer ratio of at least about 60:40, and at least one section of polyetherketoneketone fibers or mixtures thereof has a T:I isomer ratio of less than about 60:40.

13. A nonwoven mat comprising a first layer consisting of polyetherketoneketone fibers or mixtures thereof and optionally one or more additives selected from the group consisting of pigments, processing aids, and stabilizers and a second layer consisting of polyetherketoneketone fibers or mixtures thereof and optionally one or more additives selected from the group consisting of pigments, processing aids, and stabilizers, wherein the polyetherketoneketones or mixtures thereof have repeating units represented by Formula I (isomer T) and Formula II (isomer I):

-A-C(=O)—B—C(=O)—     I

-A-C(=O)-D-C(=O)—     II where A is a -Ph-O-Ph- group, Ph is a phenylene radical, B is p-phenylene, and D is m-phenylene, in a T:I isomer ratio of from 50:50 to 90:10, and wherein said polyetherketoneketone is semi-crystalline having a crystallinity of from about 10 to about 40% as measured by DSC; and wherein the second layer polyetherketoneketone fibers or mixtures thereof have a lower T:I isomer ratio relative to the first layer polyetherketoneketone fibers or mixtures thereof.

14. The nonwoven mat of claim 13, wherein the first layer polyetherketoneketone fibers or mixtures thereof have a T:I isomer ratio at least about 60:40.

15. The nonwoven mat of claim 13, wherein the first layer polyetherketoneketone fibers or mixtures thereof have a T:I isomer ratio of about 80:20.

16. The nonwoven mat of claim 13, wherein the second layer polyetherketoneketone fibers or mixtures thereof have a T:I isomer ratio less than about 60:40.

17. The nonwoven mat of claim 11, wherein the polyetherketoneketone or mixture thereof has a crystallinity, as measured by DSC, of from about 30% to about 35%.

* * * * *